United States Patent [19]
Okada et al.

[11] Patent Number: 5,547,084
[45] Date of Patent: Aug. 20, 1996

[54] ARTICLE SORTING METHOD AND SYSTEM

[75] Inventors: Nobuyuki Okada; Takuya Eikyu, both of Tokyo, Japan

[73] Assignee: Toyokanetsu Kabushiki Kaisha, Tokyo, Japan

[21] Appl. No.: 271,982

[22] Filed: Jul. 8, 1994

[30] Foreign Application Priority Data

Jul. 8, 1993 [JP] Japan ................................... 5-169268

[51] Int. Cl.⁶ ................................................. B07C 5/00
[52] U.S. Cl. ........................... 209/583; 209/3.3; 209/587; 209/939; 198/370.06
[58] Field of Search ...................... 198/370.06, 370.09, 198/370.1; 209/576, 577, 579, 583, 587, 3.3, 939; 414/278, 528

[56] References Cited

U.S. PATENT DOCUMENTS

| | | | |
|---|---|---|---|
| 3,550,748 | 12/1970 | Hauer | 198/370.06 |
| 3,752,312 | 8/1973 | Soltanoff | 209/583 X |
| 3,848,728 | 11/1974 | Leibrick et al. | 198/370.04 |
| 4,781,281 | 11/1988 | Canziani | 198/370.06 |
| 4,832,203 | 5/1989 | Nozawa | 209/3.3 |

FOREIGN PATENT DOCUMENTS

| | | | |
|---|---|---|---|
| 2450765 | 3/1979 | France | B65G 47/52 |
| 1934640 | 1/1970 | Germany . | |
| 2717199 | 11/1978 | Germany | B65G 47/52 |
| 4033699 | 12/1991 | Germany | B65G 47/52 |

*Primary Examiner*—David H. Bollinger
*Attorney, Agent, or Firm*—Sughrue, Mion, Zinn, Macpeak & Seas

[57] ABSTRACT

An article sorting method and a system to perform the method, in which a plurality of articles having different sorting destinations are sorted out in a highly efficient manner by one carriage. The article sorting system includes a carriage (3) movable along a track (5). This carriage has on it a plurality of conveying mechanisms (13a, 13b, 13c and 13d) which are provided on the carriage (3). On these conveying mechanisms, articles (11) can be placed. A control device (23) controls the operations of the plurality of conveying mechanisms (13a, 13b, 13c and 13d) independently of one another. The control device drives the conveying mechanisms (13a, 13b, 13c and 13d) individually according to the sorting destination data of the articles, so that a single or plural articles (11) are sorted out by the individual operations or combined operations of the driving mechanisms (15a, 15b, 15c and 15d).

15 Claims, 6 Drawing Sheets

5,547,084

ARTICLE SORTING METHOD AND SYSTEM

BACKGROUND OF THE INVENTION

This invention relates to an article sorting method in which a variety of articles conveyed on a conveying path are sorted out so that they are distributed to other predetermined conveying paths, and an article sorting system for practicing the method.

One example of an article sorting system of this type is a travelers' baggage sorting system employed, for instance, at air ports. At an air port, it is necessary to sort out travelers' baggage according to the travelers' destinations. The system operates to sort out pieces of baggage according to information given by the destination tags attached thereto.

FIG. 8 shows the arrangement of a conventional article sorting system 51. As shown in FIG. 8, a carriage 55 is moved along a track 53. When the carriage 55 is at a baggage receiving station 61, a piece of baggage 57 is loaded on the carriage 55 from a loading belt conveyor 67 driven in the direction of the arrow "A". Next, the carriage 55 is stopped at a baggage transferring station 63 which is selected according to the sorting data of the piece of baggage 57. At the baggage transferring station 63, a belt conveyor 59 provided on the carriage 55 is driven so that the piece of baggage 57 is unloaded from the carriage 55. More specifically, at the baggage transferring station 63, the belt conveyor 59 of the carriage 55 is driven to move the piece of baggage 57 in the direction of the arrow "B", so that the piece of baggage 57 is transferred onto a distributing belt conveyor 65 or a shooter. The track 53 is preferably endless. A number of baggage receiving stations 61 and a number of baggage transferring stations 63 are provided along the track 53.

With the system, it goes without saying that sometimes one piece of baggage 57 is loaded on one carriage 55 so as to be sorted out, and when plural pieces of baggage to be handled have the same destination, then they may be loaded on one carriage 55 so as to be sorted out.

In the conventional article sorting system, the carriage 55 has only one conveyor 59. Therefore, the carriage is allowed to transfer a piece or pieces of baggage therefrom only in one direction at a time. Hence, in the case where pieces of baggage to be handled have different destinations, they must be loaded on different, respective carriages. This lowers the baggage sorting efficiency undoubtedly. Furthermore, in the case where there are a great many pieces of baggage to be sorted out, the baggage sorting efficiency cannot be increased without increasing the driving speed of the carriage 55 and the conveyor 59. Accordingly, it is necessary to make the baggage sorting system rigid enough to withstand the high speed operation. Therefore, the conventional system is heavy and bulky.

SUMMARY OF THE INVENTION

Accordingly, an object of the invention is to eliminate the above-described difficulties accompanying a conventional article sorting system. More specifically, an object of the invention is to provide an article sorting method in which a plurality of articles having different destinations can be efficiently sorted out with one carriage, and an article sorting system for practicing the method.

The foregoing object of the invention has been achieved by the provision of the following means:

The first means is an article sorting method in which, according to the invention, a single or plural articles are loaded on a plurality of conveying means provided on a carriage which is movable along a track, and the carriage is moved to a predetermined article sorting position, where the plurality of conveying means are driven independently of one another according to sorting destination data of the articles, so that the single or plural articles are sorted out by the individual operations or combined operations of the driving means.

The second means is an article sorting system which, according to the invention, comprises:

a carriage movable along a track;

a plurality of conveying means which are provided on the carriage, and on which articles can be placed; and control means for controlling the operations of the plurality of conveying means independently of one another, the control means controlling the operations of the conveying means selectively according to sorting destination data of the articles placed on the conveying means.

In the article sorting system, a plurality of conveying means are provided on the carriage, and a plurality of articles can be placed on the conveying means and transferred from them at the same time. In addition, at the article transferring station, a plurality of articles can be distributed in different directions at the same time. In the case where an article to be handled is so large that it covers a plurality of conveying means, the latter are synchronously driven in combination so that the large article is transferred from the carriage in the desired direction.

It is preferable that the track is endless; however, a finite track may be adopted which is straight or curved. In the case where the track is endless, the carriage is circulated along the track to reach the article loading position and the article transferring station. In this case, the articles can be sorted out with high efficiency. On the other hand, in the case where the track is straight or curved, the carriage is moved backwards and forwards between the article loading station and the article transferring station, to sort out the articles.

From the point of view of the article sorting efficiency, it is preferable that a plurality of carriages are moved along the track independently or simultaneously. In this case, mobile carriages having self-driving means may be employed, or a plurality of carriages coupled to one another may be moved with driving means.

DETAILED DESCRIPTION OF THE PREFERRED EMBODIMENT

One preferred embodiment of this invention will be described with reference to the accompanying drawings.

Figure 1:
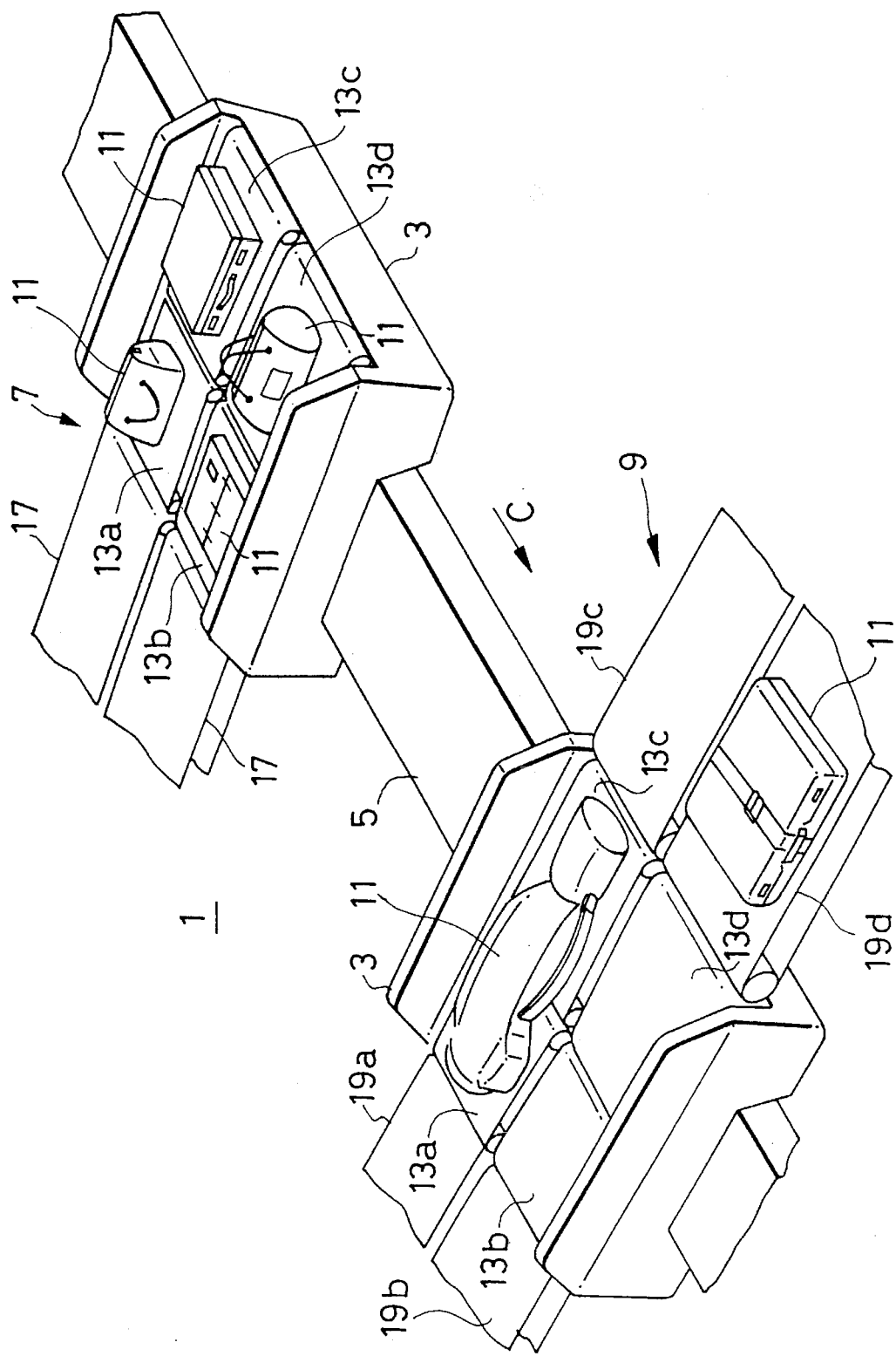
FIG. 1 is a perspective view of an article sorting system, which constitutes one embodiment of this invention.

The embodiment of the invention is an article sorting system 1 as shown in FIG. 1 which is used, for instance, for sorting out baggage at an air port (hereinafter referred to as "a baggage sorting system", when applicable).

In the article sorting system 1, a plurality of mobile carriages 3 move individually on a track 5 to stop at a baggage receiving station 7 and a baggage transferring station 9. The track 5 is endless, and the carriages 3 are moved in a predetermined direction (in the direction of the arrow C).

Each of the carriages 3 has four belt conveyors 13a, 13b, 13c and 13d (hereinafter referred to merely as "conveyors 13a, 13b, 13c and 13d", when applicable). Those conveyors 13a, 13b, 13c and 13d are driven in the forward direction or in the reverse direction by driving means 15a, 15b, 15c and 15d (described later), respectively, which can operate independently of each other and can also operate synchronously.

The carriage 3 stops at the baggage receiving station 7 temporarily, where pieces of baggage 11 are loaded on the carriage 3 from loading belt conveyors 17 (hereinafter referred to as "loading conveyors 17", when applicable). Upon completion of the loading of baggage, the carriage 3 is moved to the baggage transferring station 9, where it is stopped temporarily. At the baggage transferring station 9, the conveyors 13a, 13b, 13c and 13d are driven so that the pieces of baggage 11 are sorted out and transferred from the carriage 3 onto distributing belt conveyors 19a, 19b, 19c and 19d (hereinafter referred to as "distributing conveyors 19a, 19b, 19c and 19d", when applicable). The pieces of baggage 11 have sorting destination data, which are recorded for instance on tags attached thereto.

The sorting destination data may be in the form of bar codes, characters, symbols, and magnetic data. Preferably those sorting destination data are read with means for reading sorting destination data in the form of a reader 21 (described later) before the pieces of baggage are loaded on the carriage 3. The sorting destination data thus read are utilized to cause a control unit 23 (described later) to control the driving of the carriage 3. The sorting destination data includes information on baggage size.

Figure 2:
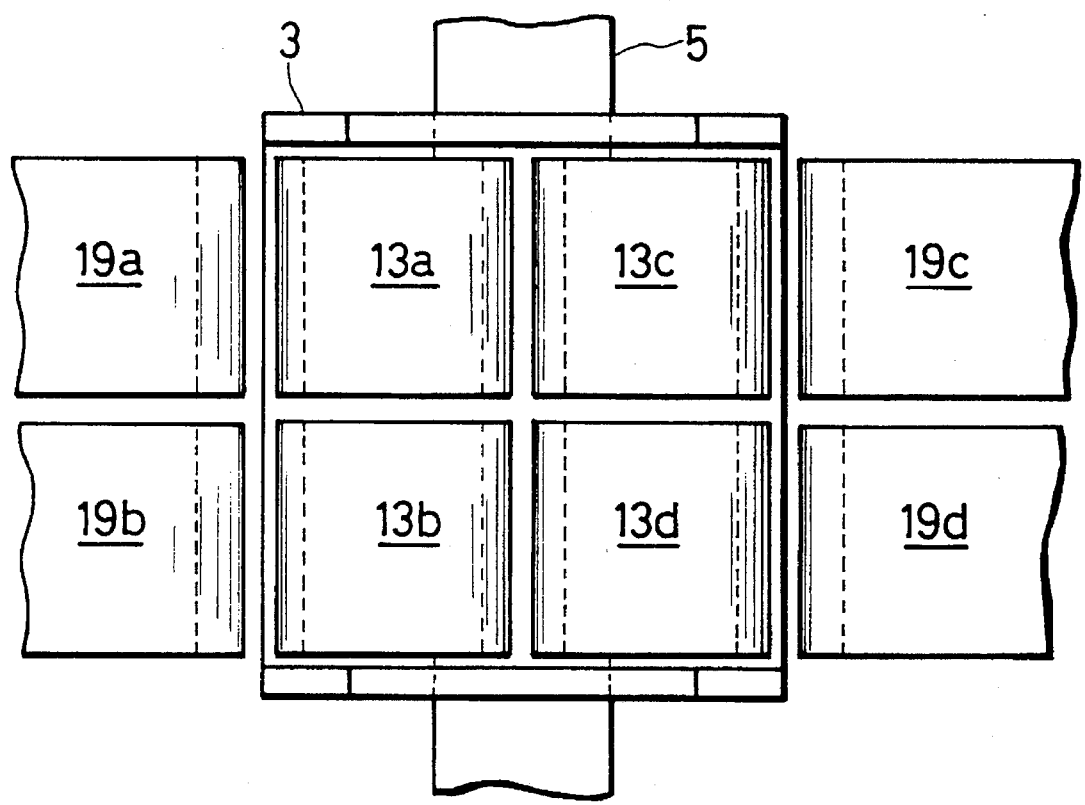
FIG. 2 is a plan view of a carriage in the article sorting system.

FIG. 2 is a plan view of the carriage 3. The four conveyors 13a through 13d, which are equal in construction, are provided on the carriage 3. The four conveyors 13a through 13d are not only able to operate independently of one another but also able to operate in cooperation with one another, to receive and transfer pieces of baggage. The driving of those four conveyors 13a through 13d will be described with reference to FIGS. 2 and 3.

Figure 3:
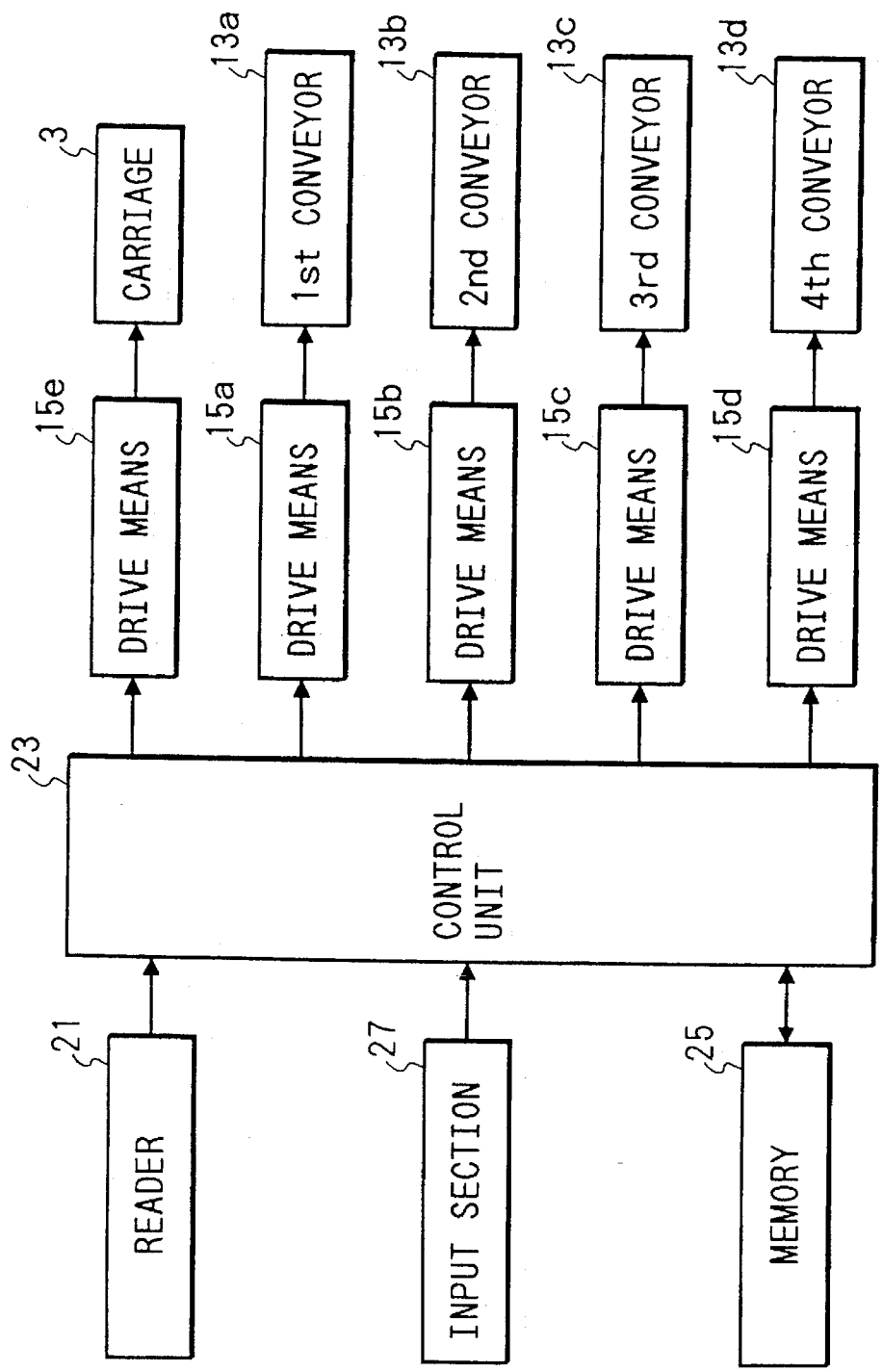
FIG. 3 is a block diagram for a description of the control of the carriage.

FIG. 3 is a block diagram for a description of the control in operation of the carriage 3. The aforementioned control unit 23 refers to the contents of a memory 25 according to the sorting destination data supplied thereto from the aforementioned reader 21, to control the operations of the driving means 15a, 15b, 15c, 15d and 15e adapted to drive the four conveyors 13a, 13b, 13c and 13d and the carriage 3. The 5 driving means 15a, 15b, 15c and 15d are able to drive the conveyors 13a, 13b, 13c and 13d not only in the forward direction but also in the reverse direction. In correspondence to the sorting destination data provided, the sorting stations, and the particular information, directions of rotation, rotating time and driving timing of the conveyors 13a, 13b, 13c and 13d to be driven, have been stored in the memory 25. When necessary, the operator may operate an input section 27 so as to apply sorting destination data to the control unit 23.

The supply of data to the control unit 23 from the reader 21 or the input section 27 may be performed by wire signal transmission or wireless signal transmission. In the case where the sorting destination data are supplied to the control unit 23 from the reader 21 or the input section 27 by wireless signal transmission, the elements other than the reader 21 and the input section 27 in FIG. 3 may be provided on the carriage 3.

A control operation for sorting pieces of baggage according to the states of the latter will be described with reference to FIGS. 4 through 7, which show various states of the carriage 3 at the baggage transferring station 9.

Figure 4:
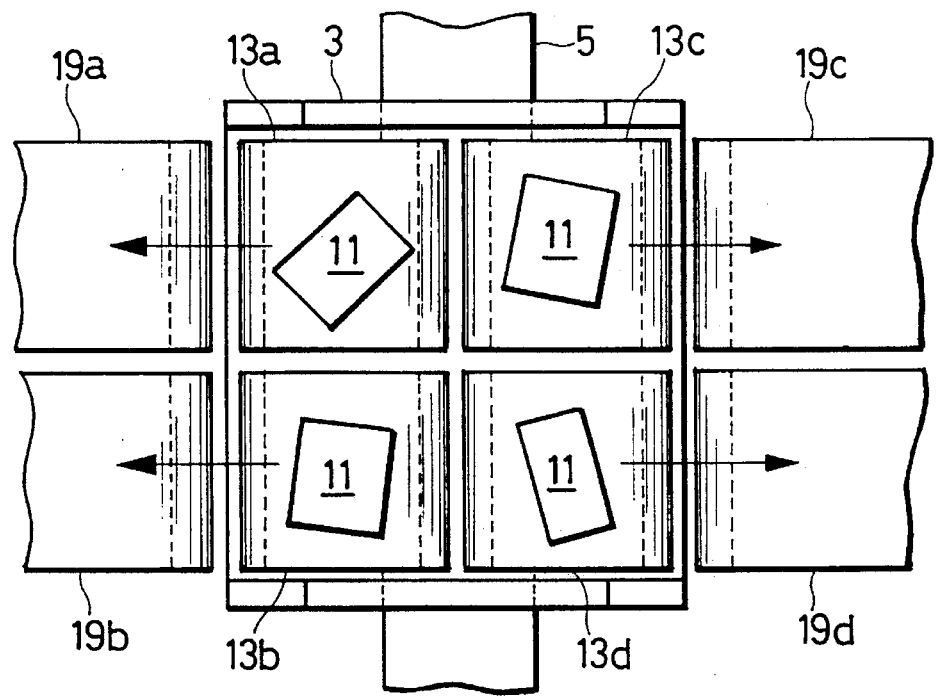
FIG. 4 is a plan view showing a first example of the way of placing pieces of baggage on the carriage.

In the case of FIG. 4, four pieces of baggage 11 are loaded on the conveyors 13a, 13b, 13c and 13d, respectively. In this case, the following first, second and third control methods may be employed: In the first control method, two pieces of baggage 11 on the left side are moved to the left, while the remaining two pieces of baggage 11 on the right side are moved to the right. In the second method, two pieces of baggage 11 on the upper side are moved to the right or to the left, while the remaining two pieces of baggage 11 on the lower side are moved to the right or to the left. In the third control method, the four pieces of baggage 11 are all moved to the right or to the left.

Figure 5:
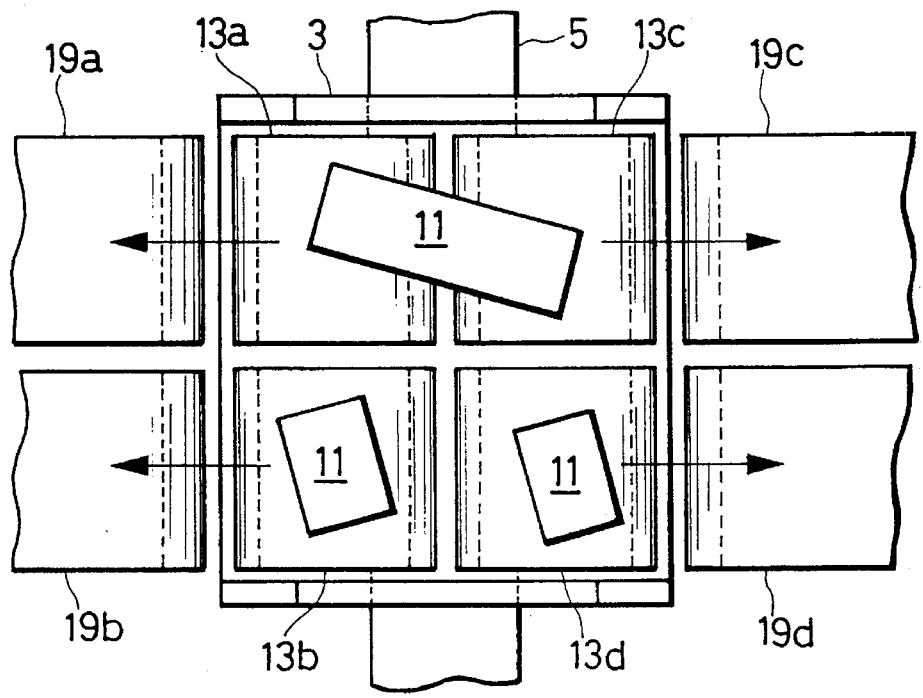
FIG. 5 is a plan view showing a second example of the way of placing pieces of baggage on the carriage.

In the case of FIG. 5, three pieces of baggage are loaded on the carriage 3; more specifically, one of them, being longer than the others, is loaded on the two conveyors 13a and 13c on the upper side, and the remaining two pieces of baggage 11 are loaded on the conveyors 13b and 13d on the lower side, respectively. In this case, the following fourth, fifth and sixth control methods may be employed: In the fourth control method, one piece of baggage 11 on the upper side and the left of the remaining two pieces of baggage 11 on the lower side are both moved to the left, while the remaining is moved to the right. In the fifth control, the one piece of baggage 11 on the upper side is moved to the right or to the left, while the remaining two pieces of baggage 11 on the lower side are moved to the right or to the left. In the sixth control method, the three pieces of baggage 11 are all moved to the right or to the left.

Figure 6:
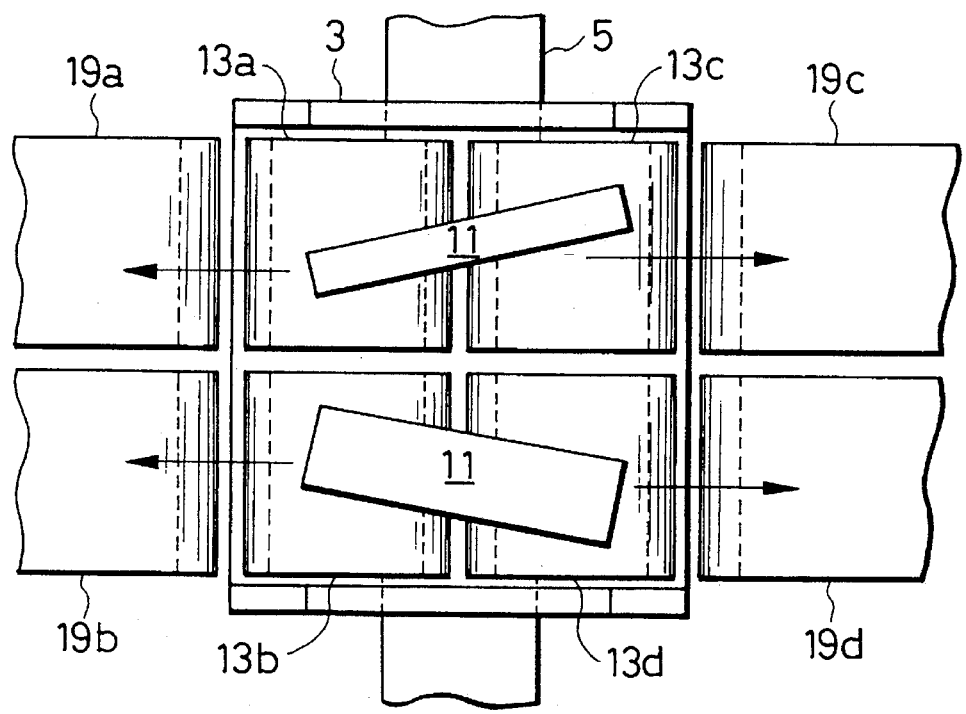
FIG. 6 is a plan view showing a third example of the way of placing pieces of baggage on the carriage.

In the case of FIG. 6, two pieces of baggage 11 which are both relatively long are loaded on the carriage 3; more specifically, one of the two pieces of baggage 11 is loaded over the two conveyors 13a and 13c on the upper side, while the other is loaded over the remaining two conveyors 13b and 13d on the lower side. In this case, the following seventh and eighth control methods may be employed: In the seventh control method, the two pieces of baggage are moved in the opposite directions. In the eighth control method, the two pieces of baggage 11 are all moved in one direction; that is, they are moved to the right or to the left.

Figure 7:
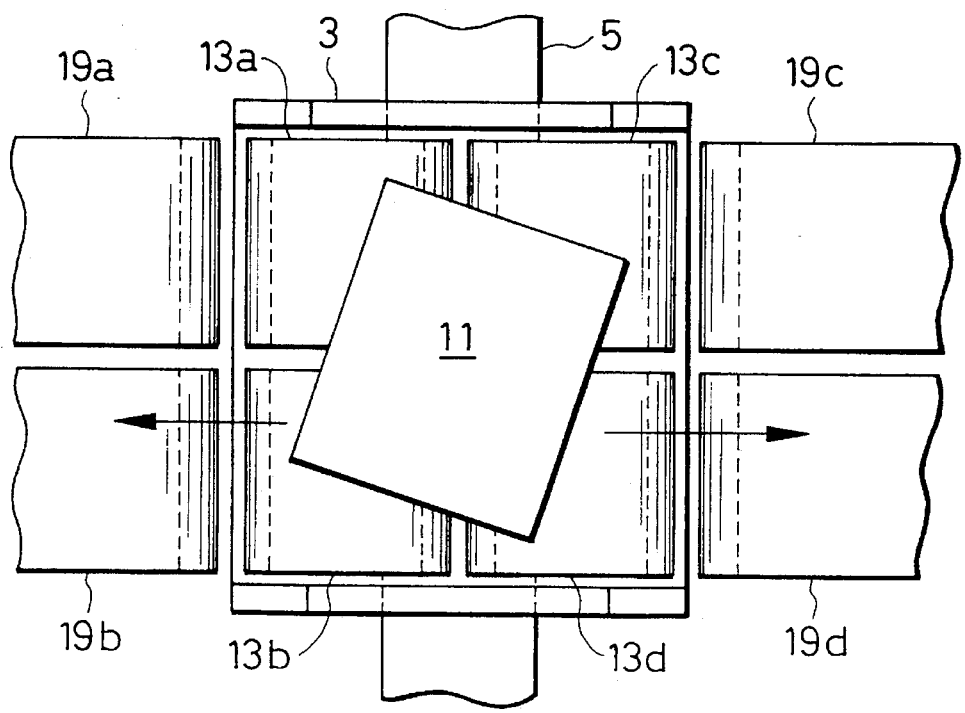
FIG. 7 is a plan view showing a fourth example of the way of placing pieces of baggage on the carriage.
Figure 8:
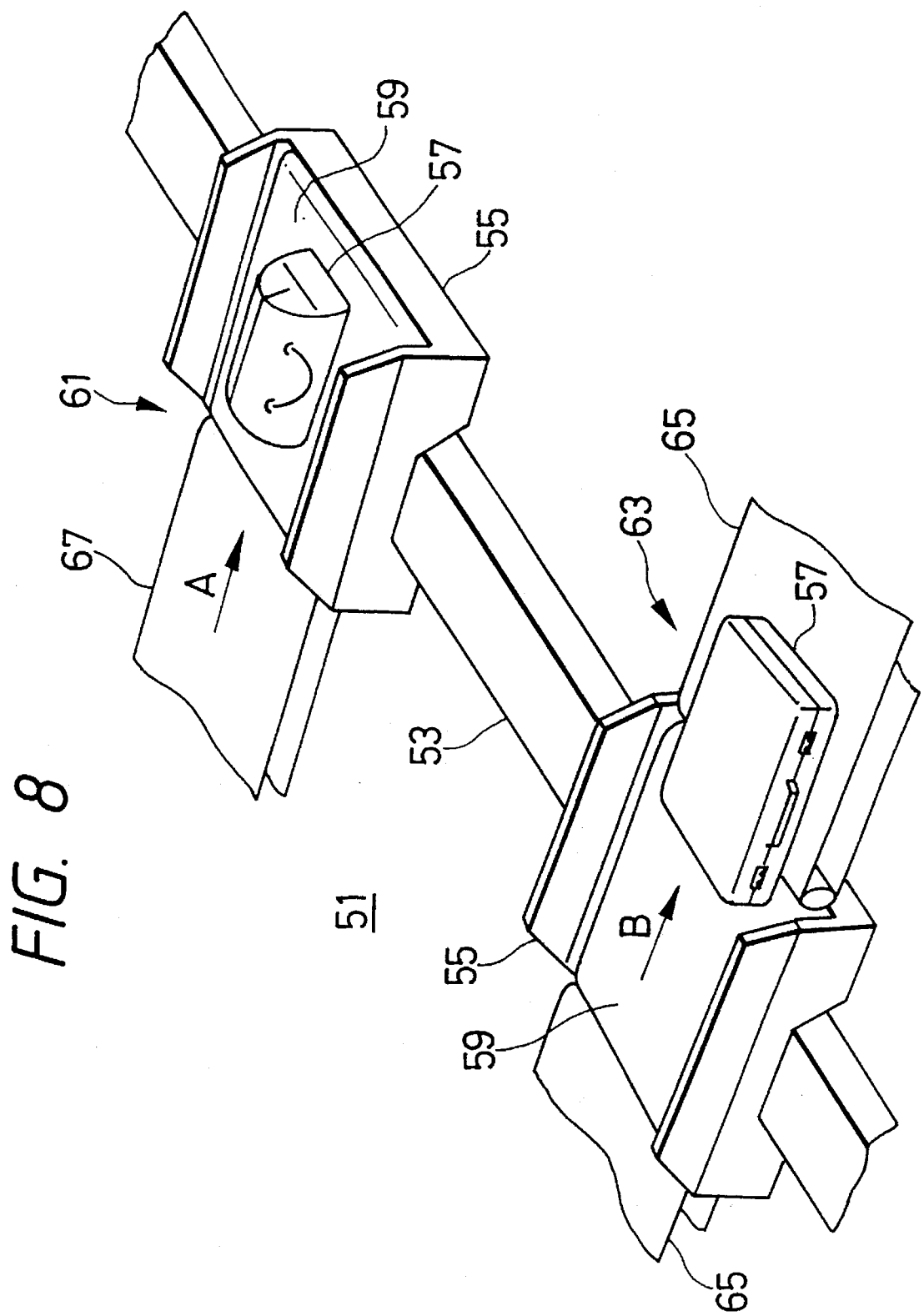
FIG. 8 is a perspective view of a conventional article sorting system.

In the case of FIG. 7, one piece of baggage 11 which is relatively large is loaded over the four conveyors 13a through 13d. In this case, the ninth control method may be employed to move the one piece of baggage 11 to the right or to the left.

In the above-described various control methods, the control unit 23 controls the directions of rotation, speeds of rotation, and driving timing of the conveyors 13a through 13d so that the pieces of baggage are moved in the predetermined directions. Hence, not only can plural pieces of baggage be loaded on one carriage 3, but also they can be moved in different directions at the same time. This means that, in the article sorting system, the baggage sorting efficiency is much higher than that in the conventional article sorting system. In the case where pieces of baggage to be handled are small in volume, the number of pieces of baggage which can be loaded on the carriage can be increased as much, yet the pieces of baggage thus loaded can be sorted out at the same time; that is, they can be quickly sorted out with high efficiency. In the case where pieces of baggage 11 to be handled are large in volume, the conveyors 13a through 13d cooperate to receive them and to transfer them in the predetermined direction or directions.

In the above-described embodiment, four conveyors 13a, 13b, 13c and 13d are arranged in a double line and double column on the surface of the carriage; however, the number and arrangement of the conveyors are not limited thereto or thereby. That is, the numbers of lines and columns on which the conveyors are arranged, may be selected freely. It is not always required to load pieces of baggage on the carriage at only one baggage receiving station and to transfer them from the carriage at only one baggage transferring station. That is, pieces of baggage may be loaded on the carriage at a plurality of baggage loading positions and may be transferred from it at a plurality of baggage transferring stations. That is, it is not always necessary to drive all of the conveyors at a baggage receiving station or at a baggage transferring station. That is, at each station, only the conveyors which are to be driven should be operated.

Furthermore, in the above-described embodiment, the belt conveyors are employed as baggage conveying means; however, they may be replaced with roller conveyors or other conventional conveying devices.

Moreover, the distributing conveyors may be arranged confronting with the loading conveyors 17 across the track 5. In this case, articles loaded on the carriage 3 from the loading conveyors 17 can be sorted to the distributing conveyors confronting with the loading conveyors 17 without the movement of the carriage 3 along the track 5 if required.

While the invention has been described with reference to the article sorting system 1 adapted to sort out travelers' baggage at an air port, the technical concept of the invention may be applied to any other article sorting system.

In the article sorting system, the carriage has a plurality of conveyors which can be operated independently of one another. Hence, articles different in sorting destination can be separately loaded on the conveyors, and those articles can be sorted out individually by driving the conveyors independently of each other. Therefore, a number of articles can be quickly sorted out. That is, in the article sorting system of the invention, the article sorting efficiency is higher than in the conventional system. Moreover, the article sorting system is not increased in weight nor in size, although it has been markedly improved in the article sorting efficiency as was described above.

What is claimed is:

1. An article sorting method comprising the steps of:
   (a) reading sorting destination data from articles;
   (b) positioning, at an article receiving section based on the sorting destination data read from said articles, a carriage having a plurality of conveying means and movable along a track;
   (c) loading one or more of said articles on selected one or ones of said plurality of conveying means provided on said carriage thus positioned;
   (d) positioning said carriage at an article sorting section; and
   (e) sorting at least one of said articles therefrom according to the sorting destination data of said articles by driving independently or cooperatively selected one or ones of said plurality of conveying means, wherein a single article is loaded over at least two of said plurality of conveying means at said article receiving section.

2. The method according to claim 1, further comprising, between the steps (c) and (d), the step of:
   moving said carriage from said article receiving section to said article sorting section along said track.

3. The method according to claim 2, wherein said track is endless and said carriage is circulated from the article receiving section to the article sorting section.

4. The method according to claim 2, wherein said track is finite, either straight or curved, and said carriage is moved backwards and forwards between the article receiving section and the article sorting section.

5. The method according to claim 1, wherein two articles are loaded on said carriage at said article receiving section, and sorted from said carriage in opposite, respective directions at said article sorting section.

6. The method according to claim 1, wherein two articles are loaded on said carriage at said article receiving section, and sorted from said carriage to different, respective downstream conveying means at said article sorting section simultaneously.

7. The method according to claim 1, wherein all of said plurality of conveying means are driven at said article sorting section.

8. An article sorting system comprising:
   a carriage movable along a track;
   four conveying means in the form of belt conveyors which are provided on said carriage, and on which articles can be placed;
   means for reading sorting destination data from said articles; and
   control means for controlling and operating selected one or ones of said belt conveyors independently or cooperatively according to said sorting destination data comprising information about the size and destination of said articles placed on said belt conveyors.

9. The system according to claim 8, further comprising:
   at least one article loading conveying means defining an article receiving section where an article can be loaded therefrom to said carriage; and
   at least one article distributing conveying means defining an article sorting section where an article can be sorted from said carriage thereto.

10. The system according to claim 8, wherein said sorting destination data is selected from the group consisting of bar codes, characters, symbols, and magnetic data.

11. The system according to claim 10, wherein:
   said means for reading said sorting destination data reads said data before said articles are loaded onto said belt conveyors;
   said means for reading stores in memory said sorting destination data;
   in correspondence with said sorting destination data, said means for reading said data stores sorting section locations and other particular information including directions of rotation, rotating time and driving time of said belt conveyors;
   said control means includes a control unit;

said control unit then uses said sorting destination data and the other information to control the operations of said belt conveyors.

12. The system according to claim 11, wherein said belt conveyors are operative independently of one another as well as cooperatively.

13. The system according to claim 12, further comprising a plurality of driving means operative to drive said belt conveyors in a forward and in a reverse direction.

14. The system according to claim 11, wherein said control means controls the directions of rotation, the rotating time, and the driving time of said belt conveyors.

15. The system according to claim 11, further comprising an input section to supply sorting destination data to said control means.

* * * * *